Patented Sept. 29, 1953

2,653,971

UNITED STATES PATENT OFFICE 2,653,971

MANUFACTURE OF ANTHRANILIC ACID

Clyde W. Balch, Toledo, Ohio, assignor, by mesne assignments, to Maumee Development Company, Toledo, Ohio, a corporation of Ohio No Drawing. Application July 27, 1951,
Serial No. 239,005

4 Claims. (Cl. 260—518)

This invention relates to the manufacture of anthranilic acid (2-aminobenzoic acid) and particularly the production of this material in a pure form and in high yield.

In the past anthranilic acid has been prepared by reacting a sodium hypochlorite or hypobromite solution with an aqueous solution of phthalimide. The usual product has been variable in quality, dark in color and yields have not been consistent.

In accordance with the present invention, sodium hypochlorite, the preferred reagent, or its equivalent, is reacted with phthalimide in alkaline solution, preferably sodium hydroxide, under closely controlled conditions and limits. When these limits are observed, a solution of sodium anthranilate results which is pale amber in color, from which an excellent grade of anthranilic acid can be obtained in high yields by the conventional subsequent processing methods. Moreover, the yields and quality are consistently high and uniform giving a product very desirable for production of flavors, dyes and pharmaceuticals.

These and other desirable results are achieved primarily through appropriate temperature control during the several steps or stages of the process. Thus the temperature of the alkaline phthalimide solution must not be permitted to rise above 35° C. (preferably not above 30° C.) for any length of time or hydrolysis of the phthalimide will cause a diminution in yield. The temperature of the alkaline hypochlorite solution must not be allowed to rise above about 15° C. during its preparation or storage, otherwise chlorate will be formed, which causes destruction of anthranilic acid with formation of dark color.

The temperature of the mixture of alkaline hypochlorite and alkaline phthalimide solution must not be allowed to rise above about 40° C. until all of the hypochlorite has been added and thoroughly mixed. If this is not observed, the reaction to give sodium anthranilate will have started before all of the hypochlorite has been added and the sodium anthranilate thus formed will react with sodium hypochlorite with the formation of colored products, and a resultant loss in yield and quality.

The limiting temperatures given here are maximum which should not be exceeded if acceptable results are to be obtained. Substantially lower temperatures have been employed with good results but are not necessary.

Since sodium anthranilate reacts with sodium hypochlorite with adverse effects, it follows that it is best to operate with a sufficient excess of phthalimide to insure complete utilization of the sodium hypochlorite. Further, an excess of alkali must be present at all times during the preparation of the hypochlorite and during the addition of the hypochlorite to the alkaline solution of phthalimide.

Contrary to publications and patent literature, it has also been found that the reaction mixture of sodium hypochlorite and alkaline phthalimide solution does not have to be heated to above 80° C. to produce anthranilic acid. Successful conversion has been obtained with reaction mixture temperatures as low as 60° C. It has also been found that the heat of reaction is sufficient to complete the reaction under the proper conditions, it being unnecessary to supply heat at any time.

The invention is described in connection with the following examples.

*Example 1.*—A solution of sodium hypochlorite is prepared by adding 10 parts of chlorine to a solution of 12.5 parts of sodium hydroxide in 30 parts of water. The temperature of the solution is maintained at 10° C. by addition of ice as required during the preparation. Meanwhile, 11 parts of phthalimide suspended in 25 parts of water are dissolved by the addition of 18 parts of sodium hydroxide in 43 parts of water with agitation at a temperature of 30° C. Cooling may be accomplished by cooling coils or by the addition of ice during the preparation of the phthalimide solution. The amounts of the several reagents are not critical, although an excess of sodium hydroxide should be employed in preparing the hypochlorite, as hereinbefore mentioned.

The hypochlorite solution is then added to the phthalimide solution at such a rate that admixture is complete before the heat of reaction can raise the temperature above 30° C. For example, with the phthalimide solution at 30° C. and the hypochlorite solution at 10° C., addition and mixing should be completed within about 60 seconds. If the hypochlorite solution were at 10° C. and the phthalimide solution at 10° C., addition and mixing could be carried out over a period of five minutes. Thus the colder the hypochlorite and phthalimide solutions are, the longer can be the time allotted for addition and mixing.

On completion of the reaction, the sodium anthranilate formed, which is pale amber in color, is separated out by lowering the pH of the solution to the isoelectric point in the conventional manner. Acidulation may be effected by addition of inorganic acids, such as hydrochloric or sulfuric acid, or by organic acid, such as acetic acid. The details of this step of the process are well known and form no part of the instant invention.

*Example 2.*—To 45 parts of crushed ice are added 12.5 parts of sodium hydroxide dissolved in 30 parts of water and cooled before addition to 20–30° C. To the resultant slurry of ice and sodium hydroxide solution are added 10 parts of liquid chlorine. It is not necessary to use liquid chlorine but if gaseous chlorine is used, an additional amount of ice must be used because of the absence of the refrigerating effect of the evaporating chlorine. A solution of 11 parts of phthalimide in a solution of 18 parts of sodium hydroxide in 68 parts of water is prepared according to Example 1, and the temperature adjusted to 30° C. The hypochlorite solution, at a temperature of 10–15° C., is then mixed with the phthalimide solution in less than 60 seconds; any shorter mixing time is satisfactory. The conversion to sodium anthranilate is complete as soon as the temperature remains constant or reaches a maximum. The final temperature may vary from 60 to 100° C. depending upon the initial temperatures of the reacting solutions and the amount of water and ice used for dissolving and cooling, although the latter are not critical. The reaction is very rapid and is ordinarily complete within several minutes after mixing. Anthranilic acid is obtained from the reaction mixture by the conventional methods known in the art.

In the foregoing examples, other alkali metal or alkaline earth metal hydroxides may be substituted for sodium hydroxide with comparable results. Similarly, the hypochlorite of the examples may be replaced by hypobromite. For convenience, all such compounds are referred to herein as alkaline compounds, and the term "alkaline hypochlorite" as used in the claim is intended to embrace these equivalent agents.

It will be appreciated that the instant process may, if desired, be carried out in a continuous manner by stream admixture of the reactants, agitation being effected during flow of the mixture, if desired, in any known manner. This and other variations of the procedure, including such modifications as would normally occur to those skilled in the art, are contemplated as part of the invention.

Having thus described the invention, what is claimed as new and desired to be secured by Letters Patent is:

1. In a method for the manufacture of anthranilic acid, the steps which comprise rapidly admixing in alkaline aqueous solution a solution of sodium hypochlorite at a temperature not exceeding 15° C. with an alkaline solution of phthalimide at a temperature not exceeding 35° C., the rate of admixture being such that the admixture is completed before the heat of reaction can raise the temperature substantially above 30° C.

2. In a method for the manufacture of anthranilic acid, the steps which comprise rapidly admixing an alkaline hypochlorite solution at a temperature not exceeding 15° C. with an alkaline solution of phthalimide at a temperature not exceeding 35° C., the rate of admixture being such that the admixture is completed before the heat of reaction can raise the temperature substantially above 30° C., and allowing the reaction to proceed to completion without the addition of heat.

3. In a method for the manufacture of anthranilic acid, the steps which comprise rapidly admixing in alkaline aqueous solution an alkaline hypochlorite solution at a temperature not exceeding 15° C. with an alkaline solution of phthalimide at a temperature not exceeding 35° C., the rate of admixture being such that the admixture is completed before the heat of reaction can raise the temperature substantially above 30° C., the amount of phthalimide being in excess of that required for complete reaction.

4. In a method for the manufacture of anthranilic acid, the steps which comprise rapidly admixing an aqueous alkaline solution of sodium hypochlorite at a temperature not exceeding 15° C. with a solution of phthalimide and sodium hydroxide at a temperature not exceeding 35° C., the rate of admixture being such that the admixture is completed before the heat of reaction can raise the temperature substantially above 30° C.

CLYDE W. BALCH.

References Cited in the file of this patent

UNITED STATES PATENTS

| Number | Name | Date |
|---|---|---|
| 1,322,052 | Potter | Nov. 18, 1919 |

FOREIGN PATENTS

| Number | Country | Date |
|---|---|---|
| 18,246 | Great Britain | 1890 |
| 55,988 | Germany | Mar. 2, 1891 |

OTHER REFERENCES

Graebe et al., Ber. Deut. Chem., vol. 35, pages 2747–8 (1902).

Graebe, Ber. Deut. Chem., vol. 35, pages 2753–6 (1902).

Adams et al., "Organic Reactions," vol. III, pages 279–285 (1946).